US005708878A

United States Patent [19]

Suh

[11] Patent Number: 5,708,878

[45] Date of Patent: Jan. 13, 1998

[54] FLASH CONTROL CIRCUIT

[75] Inventor: Inh-seok Suh, Kyungki-do, Rep. of Korea

[73] Assignee: Samsung Aerospace Industries, Ltd., Kyongsangnam-do, Rep. of Korea

[21] Appl. No.: 787,600

[22] Filed: Jan. 22, 1997

[30] Foreign Application Priority Data

Jan. 23, 1996 [KR] Rep. of Korea ........................ 96-1400

[51] Int. Cl.[6] ............................ G03B 15/05; H05B 41/32

[52] U.S. Cl. ........................................ 396/206; 315/241 P

[58] Field of Search .......................... 396/206; 315/241 P

[56] References Cited

U.S. PATENT DOCUMENTS

| | | | |
|---|---|---|---|
| Re. 35,196 | 4/1996 | Iwamoto et al. | 315/241 P X |
| 3,974,419 | 8/1976 | Adams, Jr. et al. | 315/241 P |
| 4,228,381 | 10/1980 | Hasegawa | 315/241 P X |
| 4,240,008 | 12/1980 | Numata | 315/241 P X |

*Primary Examiner*—W. B. Perkey
*Attorney, Agent, or Firm*—Finnegan, Henderson, Farabow, Garrett & Dunner, L.L.P.

[57] ABSTRACT

A flash control circuit for use with a system controller is disclosed. The circuit includes a booster unit for receiving a first voltage signal and for outputting a second voltage signal to a lamp. The booster unit boosts the first voltage signal and then charges the boosted first voltage signal. Also included is a voltage sensor for sensing the voltage of the second voltage signal and for transmitting a voltage indication signal to the system controller. An oscillator outputs the first voltage signal according to an oscillation control signal from the system controller, and a triggering unit generates a trigger pulse according to a lighting control signal output from the system controller. The circuit further includes an accidental lighting prevention unit coupled to the triggering unit. The accidental lighting prevention unit disables the lighting control signal for a first period of time after a system power signal has been switched on and disables the lighting control signal for a second period of time before the system power signal has been switched to an OFF state.

5 Claims, 3 Drawing Sheets

FLASH CONTROL CIRCUIT

BACKGROUND OF THE INVENTION

A. Field of the Invention

The present invention relates to flash control circuit. More particularly, the present invention relates to a flash control circuit for use in a camera.

B. Description of the Prior Art

FIG. 1 is a block diagram of a typical prior art flash control circuit. As illustrated in FIG. 1, the flash control circuit includes a booster 102 for applying a voltage to a lamp 101. The booster 102 boosts the voltage of a signal applied to its input, and then charges the boosted voltage. A voltage sensor 103 senses the output voltage of the booster 102, and transmits a voltage indication signal to a system controller (not shown). The system controller then outputs an oscillation control signal which controls the oscillation of a voltage input signal by an oscillator 104. The output of the oscillator 104 is then applied to the input of the booster 102, as described above. Further, a driving unit 106 is included for driving the oscillator 104 according to a system power signal input to the driving unit 106, and a power control unit 107 for controlling the operation of the driving unit 106 according to a power control signal also output from the system controller. Finally, a triggering unit 105 is included for generating a trigger pulse according to a lighting control signal output from the system controller. The lamp 101 then emits light by discharging hundreds of volts inputted by the booster 102, according to the trigger pulse which has a voltage value on the order of a thousand volts.

The operation of the circuit shown in FIG. 1 will now be described. The system controller first determines the voltage level of the booster 102 according to the voltage indication signal, and then outputs the oscillation control signal to control the oscillator 104. Under the control by the system controller, the oscillator 104 does not operate when the oscillation control signal is "low," and does operate when the oscillation control signal is "high." Therefore, when the oscillator 104 is operating, the input voltage from the driving unit 106 is applied to the booster 102. Further, the power control unit 107 controls the operation of the driving unit 106 according to the power control signal output by the system controller. The power control unit 107 disables the output voltage of the driving unit 106 when the power control signal is "high," and enables the output voltage of the driving unit 106 when the power control signal is "low." In addition, since the booster 102 will continue to charge as long as the input voltage from the oscillator 104 is present, the output voltage of the booster 102 can be uniformly maintained through proper control of the oscillator 104. Finally, the lamp 101 emits light upon discharge of hundreds of volts from the booster 102, according to the trigger pulse having a voltage value on the order of a thousand volts.

In the above prior art flash control circuit, noise is generated on the lighting control signal when the circuit's system power is switched on or off. This noise may cause the triggering unit 105 to malfunction, further causing the lamp 101 to be accidentally flashed. To prevent this, the driving unit 106 is controlled by the power control unit 107 according to the power control signal from the system controller. Under this control, the power control unit 107 enables the output voltage of the driving unit 106 at a predetermined time after the system power has been switched on, and disables the output voltage of the driving unit 106 at a predetermined time after the system power has been switched off. Thus, when the lighting control signal contains noise due to the turning on and off of the system power, the output voltage of the booster 102 is lowered during the above delay in order to prevent the lamp 101 from being accidentally flashed or turned on.

However, the above prior art flash control circuit has the following problems. First, the circuit's size is large since a separate power control unit 107 and driving unit 106 are required. Second, an additional program is required in the system program for preventing the lamp from being accidentally turned on. Third, a program for checking that the lamp is not accidentally turned on is required in the manufacturing process.

SUMMARY OF THE INVENTION

An important advantage of the present invention is the provision of an arrangement which substantially obviates one or more of the limitations and disadvantages of the prior art. In particular, the present invention is directed to a flash control circuit having a simple hardware structure which can prevent the lamp from being accidentally turned on.

Additional features and advantages of the invention will be set forth in the description which follows, and in part will be obvious from the description, or may be learned by practice of the invention. The objectives and other advantages of the invention may be realized and attained by the apparatus particularly pointed out in the written description and claims hereof, as well as the appended drawings.

To achieve these and other advantages and in accordance with the purpose of the invention, as embodied and broadly described, the invention comprises a flash control circuit for use with a system controller. The circuit includes a booster unit for receiving a first voltage signal and for outputting a second voltage signal to a lamp. The booster unit boosts the first voltage signal and then charges the boosted first voltage signal. Also included is a voltage sensor for sensing the voltage of the second voltage signal and for transmitting a voltage indication signal to the system controller. An oscillator outputs the first voltage signal according to an oscillation control signal from the system controller, and a triggering unit generates a trigger pulse according to a lighting control signal output from the system controller. The circuit further includes an accidental lighting prevention unit coupled to the triggering unit. The accidental lighting prevention unit disables the lighting control signal for a first period of time after a system power signal has been switched on and disables the lighting control signal for a second period of time before the system power signal has been switched to an OFF state.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention. In the drawings.

DESCRIPTION OF THE PREFERRED EMBODIMENTS

Embodiments of the present invention will now be described with reference to the accompanying drawings.

Figure 1:
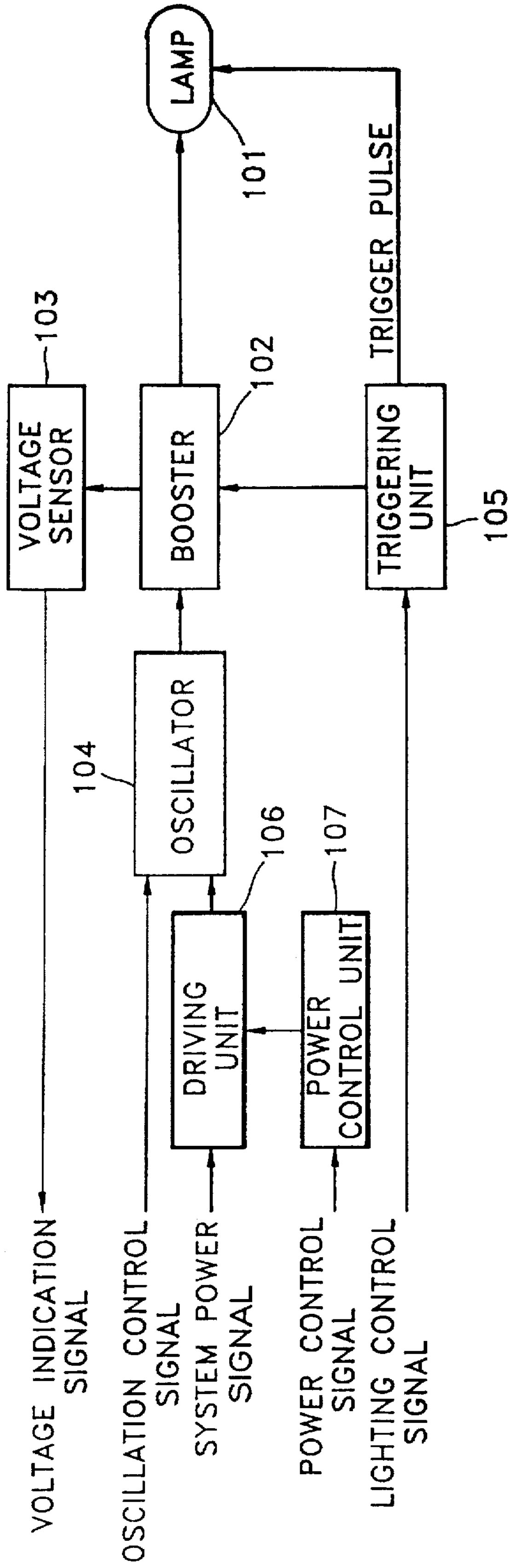
FIG. 1 (PRIOR ART)
FIG. 1 is a block diagram showing a prior art flash control circuit.
Figure 2:
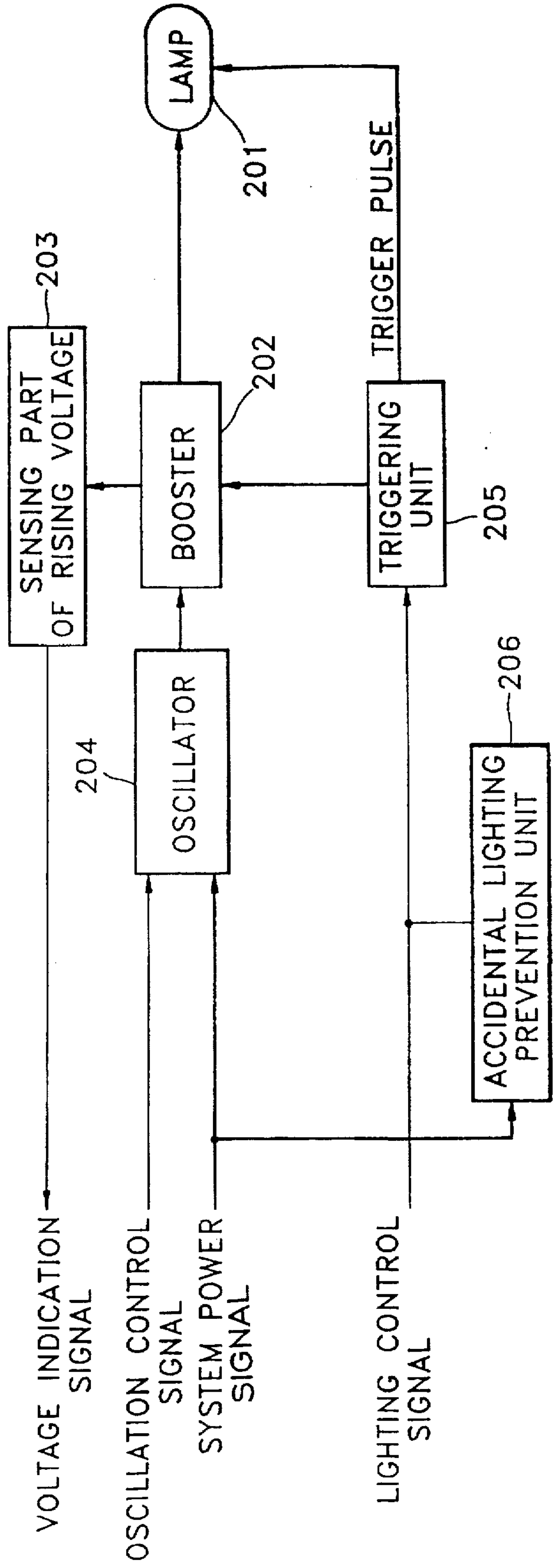
FIG. 2 is a block diagram showing a flash control circuit according to an embodiment of the present invention.

As illustrated in FIG. 2, a preferred embodiment of a flash control circuit, which may be used in a digital still camera or a strobe illumination apparatus, is provided. Referring to FIG. 2, a booster 202 receives a first voltage signal and outputs a second voltage signal to a lamp 201. The booster 202 boosts the first voltage signal, and then charges the boosted voltage signal. A voltage sensor 203 senses the voltage output by the booster 202, and transmits a voltage indication signal to a system controller (not shown). An oscillator 204 receives a system power signal and outputs the first voltage signal to the booster 202. The first voltage signal outputted by the oscillator 204 is oscillated according to an oscillation control signal output by the system controller. In addition, a triggering unit 205 generates a trigger pulse according to a lighting control signal output from the system controller. Finally, an accidental lighting prevention unit 206 is included for preventing the lamp 201 from being accidentally lit due to a malfunction in the triggering unit 205.

The operation of the circuit shown in FIG. 2 will now be described. The system controller determines the voltage level of the booster 202 according to the voltage indication signal, and then controls the oscillator 204 by the oscillation control signal. The oscillation control signal causes the oscillator 204 to not operate when the signal is "low," and causes the oscillator 204 to operate when the signal is "high." When the oscillator 204 is operating, the first voltage signal is output to the booster 202. In the booster 202, charging continues as long as the first voltage signal output by the oscillator 204 is present at the booster's input. Thus, the output voltage of the booster 202 can be controlled through control of the oscillator 204. According to the present invention, the lamp 201 emits light upon discharge of hundreds of volts from the booster 202, according to the trigger pulse having a voltage value on the order of a thousand volts.

When the system power is switched on or off during operation of the flash control circuit, a noise signal is superimposed on the lighting control signal. This may cause the lamp 201 to be accidentally activated due to a malfunction in the triggering unit 205. To prevent this, an accidental lighting prevention unit 206 is included in the flash control circuit of the present invention. The accidental lighting prevention unit 206 is set to a "high" level (enabling the lighting control signal) at a predetermined time after the system power has been switched on, and is set to "low" (disabling the lighting control signal) at a predetermined time before the system power has been switched to an OFF state. By being set to these levels at these times, the accidental lighting prevention unit 206 prevents noise from being input to the triggering unit 205 by grounding the lighting control signal when noise is generated due to the turning on and off of the system power.

Figure 3:
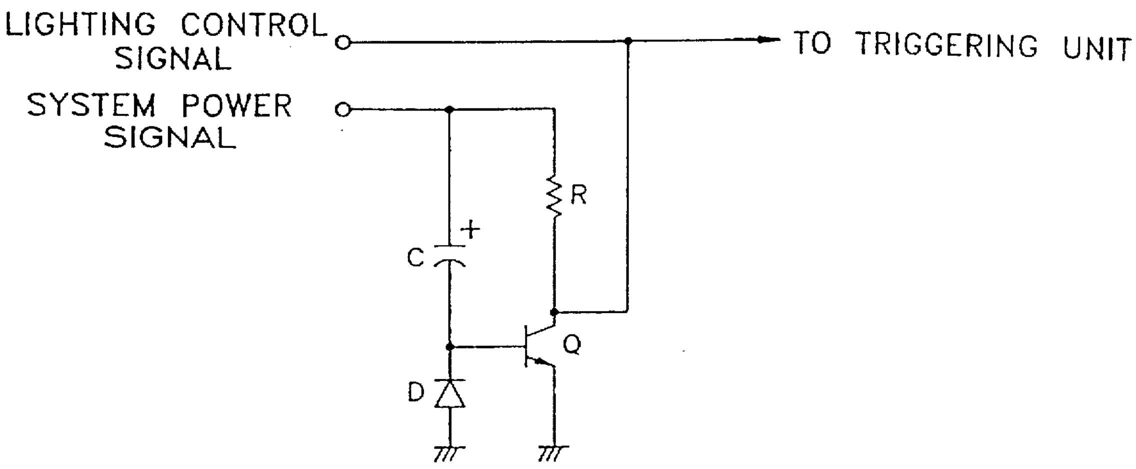
FIG. 3 is a circuit diagram showing the accidental lighting prevention unit shown in FIG. 2.

FIG. 3 is a circuit diagram showing the accidental lighting prevention unit of FIG. 2. As shown in FIG. 3, the accidental lighting prevention unit 206 includes a switching transistor Q having a collector terminal (a first switching terminal) connected to the lighting control signal, through an input terminal of the unit 206, and an emitter terminal (a second switching terminal) connected to ground. A capacitor C is connected between the unit's system power input terminal and the base terminal (a control terminal) of the switching transistor Q. Further, a biasing diode D is connected between the base terminal of the switching transistor Q and a ground terminal. Finally, a current limiting resistor R is connected between the unit's system power input terminal and the collector terminal of the switching transistor Q.

The operation of the accidental lighting prevention unit, from the time when the system power signal is first turned on to the time when the system power signal reaches its steady state value, will now be described with reference to FIG. 3. When the system power signal is initially turned on, a predetermined voltage is applied to the collector terminal of the switching transistor Q through the current limiting resistor R, and the capacitor C begins charging. The voltage across the biasing diode D forward-biases the switching transistor Q. This, in turn, causes the switching transistor Q to be switched on and the lighting control signal to be grounded through the switching transistor Q. Therefore, noise is prevented from being input to the triggering unit 205 of FIG. 2 by grounding the lighting control signal when the power system is initially switched on. When the voltage across the capacitor C is higher than that across the diode D, the switching transistor Q is switched off since the voltage on the minus terminal of the capacitor C is connected to the base of the switching transistor Q. Thus, the lighting control signal connected to the collector terminal of the switching transistor Q returns to its normal state and is input to the triggering unit 205.

The operation of the accidental lighting prevention unit 206, from the time when the system power is first switched off to the point when the system power signal reaches its steady state value, will now be described with reference to FIG. 3. When the system power is first switched off, the capacitor C will quickly discharge its stored voltage. Thus when the voltage across the capacitor C becomes lower than that across the diode D, the switching transistor Q is switched on and the lighting control signal is grounded through the switching transistor Q. Therefore, by grounding the lighting control signal before noise is generated due to the switching off of the system power, noise is prevented from being input to the triggering unit 205 of FIG. 2.

Figure 4:
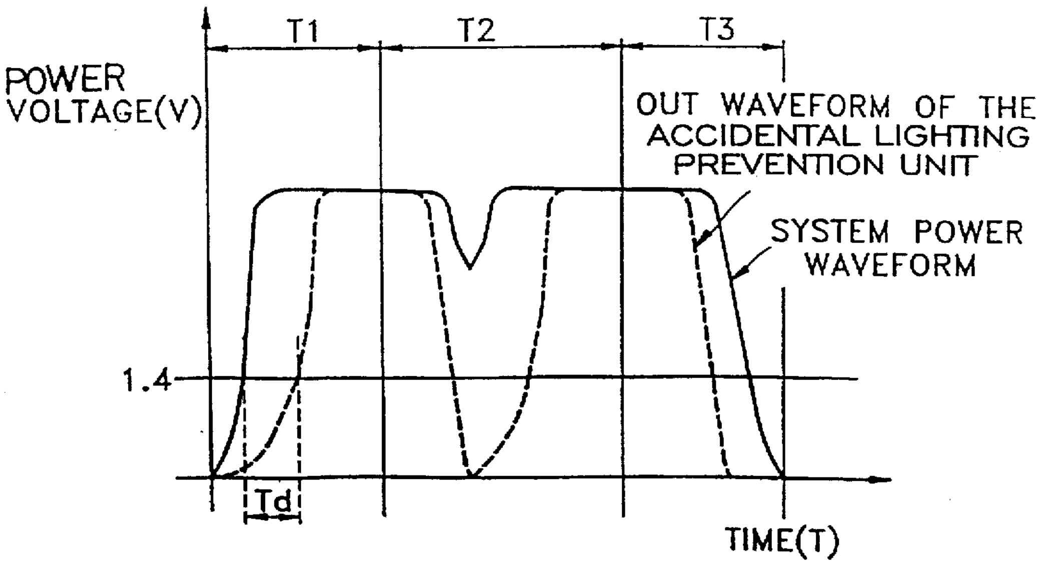
FIG. 4 is an operation timing diagram of the circuit of FIG. 3.

FIG. 4 is an operation timing diagram for the accidental lighting prevention unit of FIG. 3. In FIG. 4, T1 denotes the time from the point when the system power signal is first switched on to the point when the system power signal has reached its steady state value. T2 denotes the time required to switch the system power signal off and then immediately on again. T3 denotes the time from the point when the system power signal is first switched off to the point when the system power signal has reached its steady state value.

As shown in FIG. 4, when the system power signal reaches a value of 1.4 volts, a threshold voltage of the switching transistor Q of FIG. 3 is reached. Furthermore, the point in time in which the system power signal is switched to an ON or OFF state is determined by the threshold voltage of 1.4 volts. Over the time T1, the output waveform of the accidental lighting prevention unit 206 of FIG. 2, corresponding to the voltage measured at the first switching terminal, is delayed by an amount of time Td with respect to the waveform of the system power signal. This delay Td is proportionate to the capacitance of the capacitor C. As shown in FIG. 4, over the time T2, the output waveform of the accidental lighting prevention unit 206 is switched off more quickly and switched on more slowly than the system power waveform is respectively switched off and on. Over the time T3, the output waveform of the accidental fighting prevention unit 206 is switched off. As seen in FIG. 4, the waveform of the accidental lighting prevention unit is brought to ground faster than the waveform of the system power signal.

As described above, since the output waveform of the accidental lighting prevention unit 206 is switched off faster and switched on later than the system power waveform, the lighting control signal is grounded when the noise occurs due to the switching on and off of the system power signal. Accordingly, the present invention prevents noise from being input to the triggering unit 205 and prevents the lamp 201 of FIG. 2 from being accidentally lit due to a malfunction in the triggering unit 205. Furthermore, the hardware, the controlling program, and the checking program are each simplified by the present invention.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A flash control circuit for use with a system controller, comprising:

a booster unit for receiving a first voltage signal and for outputting a second voltage signal to a lamp, and wherein the booster unit boosts the first voltage signal and then charges the boosted first voltage signal;

a voltage sensor for sensing the voltage of the second voltage signal and for transmitting a voltage indication signal to the system controller;

an oscillator for outputting the first voltage signal according to an oscillation control signal from the system controller;

a triggering unit for generating a trigger pulse according to a lighting control signal output from the system controller; and an accidental lighting prevention unit coupled to the triggering unit which disables the lighting control signal for a first period of time after a system power signal has been switched on and disables the lighting control signal for a second period of time before the system power signal has been switched to an OFF state.

2. The circuit of claim 1, wherein the lamp emits light when the voltage of the booster unit is discharged by the trigger pulse.

3. The circuit of claim 1, wherein the accidental lighting prevention unit comprises:

a first unit terminal receiving the lighting control signal;

a second unit terminal receiving the system power signal;

a switching transistor having a first switching terminal connected to the first unit terminal, a second switching terminal connected to ground, and a control terminal;

a capacitor connected between the second unit terminal and the control terminal;

a biasing diode connected between the control terminal and the second switching terminal; and a resistor connected between the second unit terminal and the first switching terminal.

4. The circuit of claim 3, wherein the accidental lighting prevention unit comprises means for delaying an output waveform of the accidental lighting prevention unit for a predetermined time with respect to the waveform of the system power signal, during the time between the time when the system power signal is first switched on and the time when the system power signal reaches its steady state value.

5. The circuit of claim 4, wherein the delayed time is proportionate to the capacitance of the capacitor.

* * * * *